United States Patent
Münster et al.

(10) Patent No.: US 7,644,935 B2
(45) Date of Patent: *Jan. 12, 2010

(54) SPRING CARRIER WITH ADJUSTABLE SPRING COLLAR

(75) Inventors: Martin Münster, Friedrichshafen (DE); Ulrich Mair, Friedrichshafen (DE); Detlef Baasch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 412 days.

This patent is subject to a terminal disclaimer.

(21) Appl. No.: 11/333,184

(22) Filed: Jan. 17, 2006

(65) Prior Publication Data

US 2006/0175787 A1    Aug. 10, 2006

(30) Foreign Application Priority Data

Jan. 14, 2005  (DE)  ................. 10 2005 001 744
Jan. 14, 2005  (DE)  ................. 10 2005 053 493

(51) Int. Cl.
*B60G 15/00* (2006.01)
*B60G 17/00* (2006.01)

(52) U.S. Cl. .......... 280/5.514; 280/5.515; 280/124.147; 280/124.155

(58) Field of Classification Search ................. 180/209; 267/175, 218, 221, 177; 280/5.514, 5.515, 280/6.157, 43, 43.17, 43.18, 43.2, 43.23, 280/124.145–124.148, 124.154, 124.155; 188/322.16, 322.12; 248/560, 638
See application file for complete search history.

(56) References Cited

U.S. PATENT DOCUMENTS

| | | | | |
|---|---|---|---|---|
| 1,877,653 A | * | 9/1932 | Fageol | ................. 29/430 |
| 2,624,592 A | * | 1/1953 | MacPherson | ............... 180/359 |
| 2,843,345 A | * | 7/1958 | Sikorsky | ................. 244/103 R |
| 3,346,272 A | * | 10/1967 | Smith | .................. 280/124.147 |
| 3,409,286 A | * | 11/1968 | Erdmann | ................. 267/64.17 |
| 4,175,771 A | * | 11/1979 | Muzechuk et al. | .... 280/124.155 |
| 4,441,593 A | * | 4/1984 | Axthammer | ........... 188/322.19 |
| 5,133,573 A | * | 7/1992 | Kijima et al. | ......... 280/124.155 |
| 5,678,847 A | * | 10/1997 | Izawa et al. | .............. 280/5.515 |
| 6,676,119 B2 | * | 1/2004 | Becker et al. | ............... 267/218 |
| 7,135,794 B2 | * | 11/2006 | Kuhnel | ........................ 310/80 |
| 2004/0036206 A1 | * | 2/2004 | Loser et al. | ................. 267/218 |
| 2004/0075350 A1 | | 4/2004 | Kuhnel | |
| 2006/0163787 A1 | * | 7/2006 | Munster et al. | ............. 267/221 |
| 2006/0163863 A1 | * | 7/2006 | Ellmann et al. | ............. 280/788 |

(Continued)

FOREIGN PATENT DOCUMENTS

DE    3440559 A1  *  5/1986

(Continued)

*Primary Examiner*—Paul N Dickson
*Assistant Examiner*—Laura Freedman
(74) *Attorney, Agent, or Firm*—Cohen Pontani Lieberman & Pavane LLP

(57) ABSTRACT

A spring carrier for mounting a spring strut to a vehicle body includes a vibration damper having a cylinder and a piston rod which is axially guided in the cylinder, first and second spring collars, and a spring located between the spring collars. An actuator includes a nut and a threaded spindle surrounding the piston rod, the actuator being driven to change the relative axial position of the spring collars. A guide tube extends coaxially between the piston rod and the threaded spindle, the threaded spindle being supported radially against the guide tube by a bearing.

14 Claims, 2 Drawing Sheets

U.S. PATENT DOCUMENTS

2007/0210539 A1* 9/2007 Hakui et al. ............. 280/5.514

FOREIGN PATENT DOCUMENTS

| DE | 195 10 032 | 9/1996 |
| --- | --- | --- |
| DE | 101 22 542 | 2/2002 |
| DE | 102 55 764 | 2/2004 |
| DE | 102 37 644 | 3/2004 |
| FR | 2546111 A1 * | 11/1984 |
| FR | 2 840 257 | 12/2003 |
| FR | 2843620 A1 * | 2/2004 |
| JP | 11-108100 | 4/1999 |
| JP | 2003267021 A * | 9/2003 |

* cited by examiner

SPRING CARRIER WITH ADJUSTABLE SPRING COLLAR

BACKGROUND OF THE INVENTION

1. Field of the Invention

The invention relates to spring carrier for mounting a spring strut to a vehicle, including a vibration damper including a cylinder and a piston rod which is axially guided in the cylinder, first and second spring collars with a spring therebetween, and an actuator which is driven to change the relative axial position of the spring collars.

2. Description of the Related Art

A vehicle chassis which comprises a spring carrier with an adjustable spring collar for a suspension spring is known from DE 102 55 764 B3, which represents the underlying state of the art. To actuate the spring collar, an actuator designed as an electric motor is used, which drives a hollow threaded spindle. A threaded nut is mounted on the actuating thread of the threaded spindle, and this nut is connected in turn to an adjustable spring collar. The rotary motion of the motor is converted by the combination of the spindle and the threaded nut into an axial motion of the spring collar. In the case of a passenger vehicle, for example, a suspension spring must support one-quarter of the entire load of the vehicle. The spring force is transmitted via the threaded nut/threaded spindle combination to the rotor and from there to the housing of the electric motor, which is connected by a resilient mount with both angular and impact resilience to a vehicle body.

A piston rod of a conventional vibration damper extends through the hollow threaded spindle. An axial bearing, which allows the piston rod a certain freedom of movement with respect to the vehicle body, is mounted on the outer end of the piston rod. The piston rod is attached to the mount by way of a cup-shaped component, against which the housing of the actuator is also supported. It follows from this that no relative movement can occur between the piston rod and the actuator.

The high-frequency damping forces which occur in the vibration damper are transmitted via the resilient mount to the vehicle body. Because of the spring forces which are present, the resilient mount is designed to be very stiff, with the result that the damping forces are transmitted almost unsprung to the vehicle body, where clearly audible noises occur.

Any transverse forces which the suspension spring may transmit to the threaded spindle are absorbed by the piston rod of the vibration damper, acting via a needle bearing. As a result, however, a transverse force is generated inside the vibration damper, which leads to an increase in the friction between the piston rod and the piston rod guide (not shown). As a result, the increase in static friction in the vibration damper leads to a loss of driving comfort.

Another disadvantage of this spring carrier is that it is very difficult to remove the vibration damper when it needs to be repaired. For this purpose, the entire spring carrier must be removed from the vehicle first. Then the housing with the stator and a lock washer can be removed so that then the piston rod can be pulled from the threaded spindle. On closer consideration, it is obvious that the installation of the vibration damper must also be rather complicated, because the thrust stop is peened onto the piston rod, and the threaded spindle has a much smaller inside diameter than the outside diameter of the thrust stop.

SUMMARY OF THE INVENTION

The task of the present invention is to realize a spring carrier which can be assembled easily with a vibration damper and which can reliably absorb transverse forces.

According to the invention, a guide tube extends between the piston rod and the threaded spindle, and the threaded spindle is supported radially against the guide tube.

The guide tube prevents the threaded spindle from being deformed by the force of the springs and thus from generating clamping forces together with the threaded nut. The great advantage is also offered that the vibration damper can be installed and removed without the need for any work on the actuator, for example.

A second resilient mount is installed between the piston rod and the guide tube, so that the piston rod can move relative to the first resilient mount. The guide tube has a mounting surface for the first resilient mount. The first and second resilient mounts are arranged functionally in series, but as a result of a difference between their spring rates, the second mount having a lower spring rate, there is a clear-cut functional separation between them. At the same time, the guide tube creates an interconnected structural unit containing both mounts.

The mounting surface for the first resilient mount is provided on a mounting flange of the guide tube. The mounting flange can be used as a central fastening element inside the spring strut.

The actuator is designed as a rotary drive. A bearing for the rotor of the rotary drive can also be supported against the mounting flange. This variant guarantees that the threaded spindle will run with precise concentricity, because the threaded spindle and the rotor are both centered by the same component.

The guide tube can be divided at a certain point along its length. By means of this measure, it is easier to gain access to the bearings located between the threaded spindle and the guide tube.

It is also possible to connect the guide tube to the housing of the actuator. This provides the guide tube with a very strong mounting.

With respect to the assembly of the vibration damper, it is especially advantageous for a thrust stop to be attached to the guide tube, this stop going into effect when the piston rod reaches a certain point along the course of its inward travel. A thrust stop is often attached to the piston rod outside the cylinder. The thrust stop could thus interfere with the course of the assembly work, especially when the piston rod is pushed into the guide tube. This problem does not occur with the new solution.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
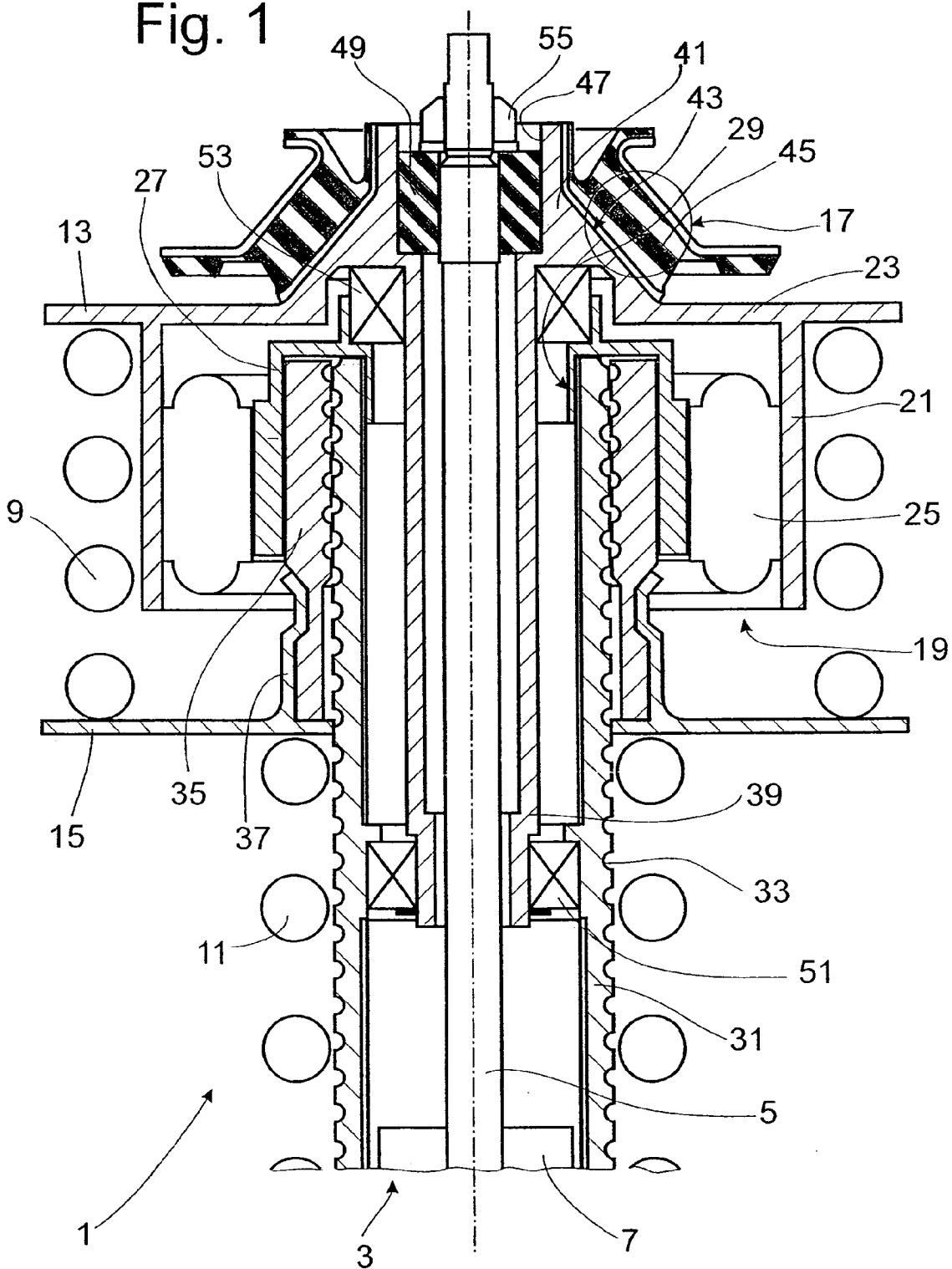
FIG. 1 shows a cross section of a spring strut according to the invention.

FIG. 1 shows the upper part of a spring strut 1, which is installed, for example, between a vehicle axle (not shown) and a vehicle body. A vibration damper 3, known in and of itself, includes an axially movable piston rod 5 in a cylinder 7, and is surrounded by a first spring 9 and a second spring 11. The first spring 9 is clamped between a first spring collar 13 and a second spring collar 15. The second spring 11 is located between the bottom side of the second spring collar 15 and a third spring collar (not shown), which is attached optionally either to the cylinder 7 or to a part of the vehicle axle. The upper spring collar 13 is connected by a universally resilient mount 17 to the vehicle body. A rotary drive 19 in the form of an electric motor is also attached to this head bearing. The rotary drive comprises a housing 21 with an end part 23, which forms a one-piece unit with the upper spring collar 13.

In the housing 21, a ring-shaped stator 25 is installed, which drives a rotor 27 with a U-shaped cross section. A threaded spindle 31 is attached to an axial sidepiece 29 of the rotor 27; the outer lateral surface of this spindle has an actuating thread 33. A threaded nut 35 engages in the actuating thread 33, this nut being in working connection with the second spring collar 15 by way of an intermediate sleeve 37. As a function of the rotational movement of the rotor 27 and thus of the threaded spindle 31, the threaded nut 35 executes translational axial movement, which is accompanied by the synchronous movement of the second spring collar 15, as a result of which the overall spring force of the two springs 9, 11 can be adjusted to compensate, for example, for a rolling motion of the vehicle body.

Starting from the resilient mount 17, a guide tube 39 extends through the inside of the threaded spindle 31. The guide tube has a mounting flange 41 with a mounting surface 43 for the mounting bearing 17. As a result, the guide tube is supported in a stationary manner in the axial direction and in the radial direction with respect to the mount 17. In addition, the guide tube is connected by its mounting flange 41 to the housing 21 of the rotary drive. The mount 17 has an elastomeric body 45, so that the guide tube 39, the actuator 19, and the first spring collar 13 have a limited freedom of resilient movement.

The guide tube 39 has a cup-shaped expansion 47 to hold a resilient mount 49 for the piston rod 5, so that the mount 49 of the piston rod can be supported against the guide tube by a fastener 55 such as a nut. The outside diameter of the piston rod 5 is smaller than the inside diameter of the guide tube 39, and the spring rate of the second resilient mount 49 is lower than that of the elastomeric body 45. As a result, the piston rod can move relative to the first mount 17 by way of the second mount 49 of the spring strut but requires no separate attachment to the vehicle body.

The guide tube 39 also provides a support function for the threaded spindle 31 of the rotary drive. For this purpose, the guide tube has a first rolling bearing 51 for the threaded spindle 31. A second rolling bearing 53, which is supported on the bottom side of the mounting flange 41, centers the rotor 27 and the upper end of the threaded spindle 31 with respect to the guide tube 39.

Figures 2A, 2B:
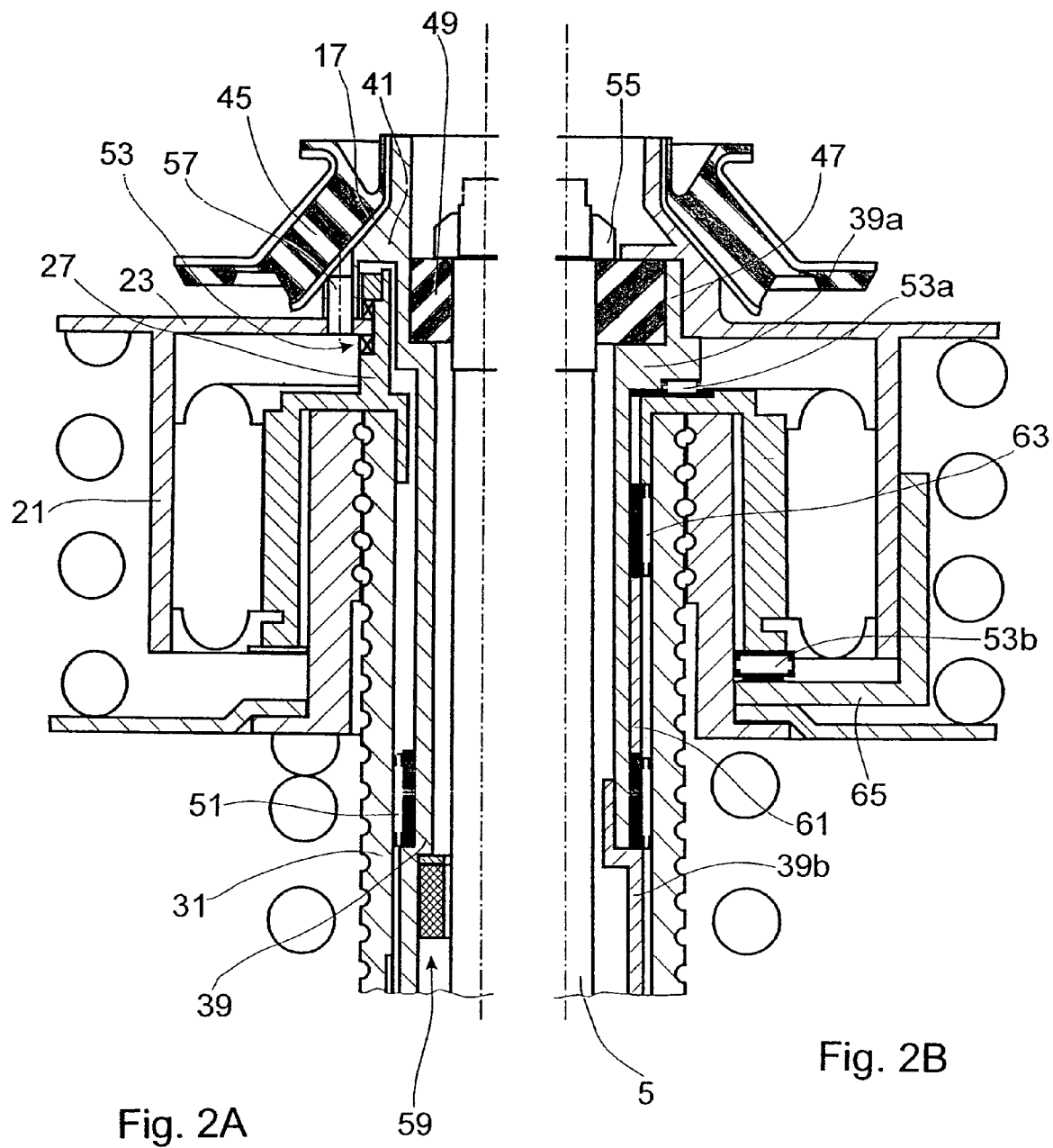
FIG. 2A shows a half across section of the spring strut of FIG. 1 with a thrust stop.
FIG. 2B shows a half cross section of the spring strut of FIG. 1 with a divided guide tube.

FIGS. 2A and 2B show two design variants pertaining to the design of the guide tube 39, of the rotor 27, and of the housing 21 with the end part 23. In FIG. 2A, the housing 21 and the end part 23 form a single structural unit, which is connected by fastening means 57 to the mounting flange 41 of the guide tube. The second rolling bearing arrangement 53 for the threaded spindle 31 on the rotor side is realized in the form of two bearings, one underneath, the other above, the end part 23. These bearings can be designed as angular-contact ball bearings in an "X" or "O" arrangement, for example. The advantage of this embodiment over that of FIG. 1 is that is easier to manufacture the guide tube 39 and the housing 21. FIG. 2A also shows a thrust stop 59, which is attached to the guide tube 39 and which goes into effect against the upper end surface of the cylinder when the piston rod 5 reaches a defined point during its inward travel.

FIG. 2B shows a second variant, in which the bearing arrangement of the rotor 27 and of the threaded spindle 31 is based on the use of needle bearings. In addition, the guide tube 39 is connected by the end part 23 to the mounting bearing 17. So that the bearings can be easily installed or removed, the guide tube 39 is divided at a certain point along its length. A first guide tube section 39a extends from the cup-shaped expansion 47 to the lower bearing 51 of the threaded spindle. A second guide tube section 39b supports the bearing 51 and a spacer sleeve 61, which extends up as far as an upper bearing 63 of the threaded spindle 31. The mounting on the rotor side is accomplished by a first bearing 53a between the rotor and the guide tube 39 and by a second bearing 53b on the lower end part 65 of the housing 21. Thus the two end parts 23, 65 of the housing 21 surround the rotor 27, which is fixed in the axial direction by the two bearings 53a, 53b.

Because of the use of a guide tube 39 which is separate from the piston rod 5, the vibration damper 3 can be removed from the spring carrier regardless of the design of the guide tube and/or of the housing simply by disconnecting the fastener 55. There is no need to remove any of the other parts of the spring carrier.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spring carrier for mounting a spring strut to a vehicle body, the carrier comprising:
   a vibration damper comprising a cylinder and a piston rod which is axially guided in the cylinder;

a first spring collar, a second spring collar, and a spring located between the spring collars;

an actuator comprising a nut and a threaded spindle surrounding the piston rod, the actuator being driven to change the relative axial position of the spring collars, wherein the actuator comprises a rotary drive which rotates the spindle in order to move the nut axially;

a guide tube extending coaxially between the piston rod and the threaded spindle, the guide tube being configured to support the threaded spindle in a fixed axial position relative to said guide tube; and at least one bearing which supports the spindle radially against the guide tube.

2. The spring carrier of claim 1 wherein the guide tube has a mounting surface, the carrier further comprising a first resilient mount fixed to the mounting surface for mounting the guide tube to the vehicle body.

3. The spring carrier of claim 1 wherein the guide tube has a circumferential flange on which a mounting surface is provided, the mounting surface extending both axially and radially.

4. The spring carrier of claim 1 wherein the rotary drive has a rotor, the carrier further comprising a bearing which supports the rotor against the guide tube.

5. The spring carrier of claim 1 wherein the guide tube has an axis and is divided transversely with respect to said axis into two pieces.

6. The spring carrier of claim 1 wherein the actuator comprises a housing which is fixed to the guide tube.

7. The spring carrier of claim 1 further comprising a thrust stop fixed inside the guide tube, the thrust stop limiting travel of the piston rod into the cylinder.

8. The carrier of claim 1 further comprising a second resilient mount between the piston rod and the guide tube, whereby the piston rod can move relative to the first resilient mount.

9. The spring carrier of claim 1 comprising a pair of axially spaced bearings which support the spindle radially against the guide tube.

10. The spring carrier of claim 9 wherein the axially spaced bearings are needle bearings.

11. The spring carrier of claim 1 further comprising at least one bearing which supports said spindle axially against the guide tube.

12. The spring carrier of claim 1, wherein the guide tube comprises a mounting flange having a mounting surface, and the first resilient mount is disposed on the mounting surface.

13. The spring carrier of claim 1, wherein the guide tube comprises a first rolling bearing configured for supporting the threaded spindle.

14. A spring carrier for mounting a spring strut to a vehicle body, the carrier comprising:

a vibration damper comprising a cylinder and a piston rod which is axially guided in the cylinder;

a first spring collar, a second spring collar, and a spring located between the spring collars:

an actuator comprising a nut and a threaded spindle surrounding the piston rod, the actuator being driven to change the relative axial position of the spring collars;

a guide tube extending coaxially between the piston rod and the threaded spindle, the guide tube being configured to support the threaded spindle in a fixed axial position relative to said guide tube, and the threaded spindle being supported radially against the guide tube, wherein the guide tube comprises a first rolling bearing configured for supporting the threaded spindle; and a rotor and second rolling bearing configured for centering the rotor and an upper end of the threaded spindle with respect to the guide tube.

* * * * *